June 30, 1931. C. DE LA BARRE DE NANTEUIL  1,812,259
PLANT FOR HEATING MOTOR VEHICLES
Filed Aug. 28, 1926
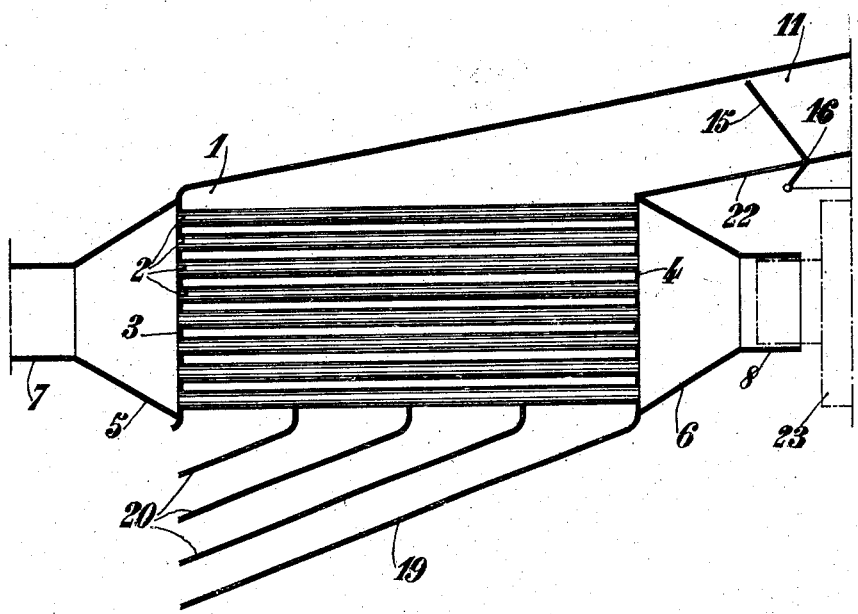
C. de la. Barre de Nanteuil
Inventor
By: Marks & Clerk
Attys.

Patented June 30, 1931

1,812,259

UNITED STATES PATENT OFFICE

CHRISTIAN DE LA BARRE DE NANTEUIL, OF VERSAILLES, FRANCE

PLANT FOR HEATING MOTOR VEHICLES

Application filed August 28, 1926, Serial No. 132,260, and in France February 4, 1926.

The present invention has for object a plant for heating motor vehicles.

This plant is mainly characterized by the arrangement, on the exhaust tube of the engine, of a tubular heat exchanger through the tubes of which preferably pass the exhaust gases for heating a fluid (air or water) circulating in a casing enclosing these tubes, the said fluid being subsequently used for heating the vehicle.

The invention is clearly illustrated in the accompanying drawing, in which the figure represents a sectional elevational view of the invention and in which the heat transmitting fluid is air.

The form of construction of the invention illustrated in the drawing has been subjected to practical experiments and to trials and has given entire satisfaction, concerning the perfection of the heating of the car, the complete absence of blowing of dust within the latter, and the improvement in the efficiency of the engine.

This form of construction comprises, in combination, the tubular heat exchanger arranged on the exhaust pipe either in the place and instead of the exhaust box, or on the up side of the latter, an air inlet shaft divided in several channels by baffle plates which distribute the air streams throughout the length of the exchanger, a pipe line leading the hot air from the exchanger to a heating aperture or to a radiator arranged in the car, and a valve, which can be operated at will and arranged for permitting either the closing of the said pipe line and the opening of an orifice allowing hot air to flow in the atmosphere, or the closing of this orifice and the opening of the said pipe line.

The apparatus illustrated in the drawing comprises an exchanger 1 provided with tubes 2 through which pass the exhaust gases. This exchanger is substantially composed of a body 1 receiving at its ends two tube plates 3 and 4 and two caps 5 and 6 connected to pipes 7—8 which permit the apparatus to be connected with the normal exhaust piping of the engine.

The body 1 is open at its lower part and receives an air inlet shaft 19 the opening of which is preferably turned towards the front of the car. This air shaft is preferably divided by baffle plates 20 in several conduits which distribute the entering cold air throughout the length and at different zones of the exchanger.

At the upper part is arranged a pipe line 21 which connects the body 1 of the exchanger to a heating aperture or to a radiator arranged within the car. A flap valve 15, pivoted at 16, and controlled from any suitable place by a suitable kinematic connection allows either to obturate the pipe line 21 when it is desired to suppress the heating and then to open the orifice 22 which allows hot air to flow in the atmosphere, or to close this orifice and to open the pipe line 21 when it is desired to heat the car. Of course, for obtaining a moderate heating the flap valve can also be left in an intermediate position allowing a portion of the hot air to flow towards the exterior.

The body of the heat exchanger can be connected to the exhaust box 23, as illustrated, or this heat exchanger can serve, by a judicious choice of the dimensions, as exhaust box, the normal exhaust box being then done away with.

Instead of causing the exhaust gases to pass through the tubes, they might be caused to pass between the tubes, the air then circulating in the tubes which, instead of being horizontal, might also be vertically arranged. Preferably the tubes will be arranged in quincunx or staggered position for ensuring the removal of dust which in practice has proved to be absolutely perfect, no dust whatever entering within the car. The tubes can have any suitable cross section, obliquity or inclination and any curvature.

The heating device described gives a rapidity of heating such that the hot air is felt at the heating aperture as soon as the car has run two hundred yards.

The intensity can be evaluated by the fact that the grate of the heating aperture very rapidly reaches a temperature interdicting the contact of the hand.

Ventilation is ensured, since the hot air is the constantly renewed air of the road, without there being any draught, dust or bad smell.

The considerable absorption of calories produced by the air in its circulation about the pipes of the heater ensures a suction which greatly promotes the evacuation of the exhaust gases, and, consequently the efficiency of the engine. In fact, experience shows that an engine provided with this air heater has a tendency to rotate more rapidly and at the same time the temperature of the water of the radiator has a tendency to fall.

The air heater in accordance with the invention is therefore always useful, in all seasons, since it constitutes a muffler favorable for the engine and during winter an intense and immediate hot air stove.

Moreover, it is not cumbersome and does not necessitate any attention, since it does not comprise any complex mechanism.

It can be put, at will, in the place of the existing exhaust box, or it can be interposed on an exhaust pipe, the existing exhaust box being maintained. In both cases, the fitting up of this air reheater is extremely simple and rapid. The heating aperture in the car can be provided in the floor or in any wall and, obviously, does not occupy any room.

What I claim as my invention and desire to secure by Letters Patent is:—

1. In a heat exchange device for use in heating vehicles, a casing, headers connected to the opposite ends thereof, parallel tubes connecting the headers together and positioned within the casing, one of the headers being connected to a source of heated fluid and the other header being provided with a discharge opening, said casing having openings in the top and bottom walls which extend from one header to the other longitudinally of the casing, an air inlet member connected about the bottom opening including a bottom wall inclined forwardly from the rear header and having an open front transversely disposed, inclined partitions within said air admitting member and forming conduits, each of which direct the incoming air to different zones of the tubes, a rearwardly inclined pipe leading from the upper wall of the casing and provided in its lowermost portion adjacent the casing with an orifice, and a valve located adjacent the orifice in said exit pipe and mounted to close either the orifice or the pipe.

2. In a heat exchange device for use in heating vehicles, a casing, headers formed at opposite ends of the casing, parallel tubes connecting the headers within the casing, one of the headers being connected to a source of heated fluid and a discharge opening in the other header, said casing being provided with ingress and egress openings by opposite sides of the casing to permit fluid to pass around the tubes, said ingress opening being disposed below the vehicle and comprising a plurality of parallel and superimposed partitions forming conduits each of which directs the fluid to different zones of the tubes.

3. In a heat exchange device for use in heating vehicles, a casing, headers formed at opposite ends of the casing, parallel tubes connecting the headers within the casing, one of the headers being connected to a source of heated fluid and a discharge opening in the other header, said casing being provided with ingress and egress openings by opposite sides of the casing to permit fluid to pass around the tubes, said ingress opening being disposed below the vehicle and comprising a plurality of parallel and superimposed partitions forming conduits whose inlets are displaced relatively to each other, each of the conduits directing the fluid to different zones of the tubes.

4. In a heat exchange device for use in heating vehicles, a casing, headers formed at opposite ends of the casing, parallel tubes connecting the headers within the casing, one of the headers being connected to a source of heated fluid and a discharge opening in the other header, said casing being provided with ingress and egress opening by opposite sides of the casing to permit fluid to pass around the tubes, said ingress opening being disposed below the vehicle and comprising a plurality of parallel and superimposed partitions forming conduits arranged at an angle to the direction of the tubes, the inlets of the conduits being displaced relatively to each other, and each of the conduits directing the fluid to different zones of the tubes.

5. In a heat exchange device for use in heating vehicles, a casing, headers formed at opposite ends of the casing, parallel tubes connecting the headers within the casing, one of the headers being connected to a source of heated fluid and a discharge opening in the other header, said casing being provided with ingress and egress openings by opposite sides of the casing to permit fluid to pass around the tubes, said ingress opening being disposed below the vehicle and comprising a plurality of parallel and superimposed partitions forming conduits arranged at an angle to the direction of the tubes, the inlets of the conduits being displaced relatively to each other, the inlets of the conduits directing the fluid to different zones of the tubes, and a pipe connected to said egress opening, said pipe having an orifice therein, a valve located adjacent to the orifice in said pipe and means to operate said valve to either close said orifice or the said pipe.

In testimony whereof I have signed my name to this specification.

CHRISTIAN de la BARRE de NANTEUIL.